United States Patent
Tsuda (10) Patent No.: US 8,952,982 B2
(45) Date of Patent: Feb. 10, 2015

(54) IMAGE DISPLAY DEVICE, IMAGE DISPLAY METHOD AND INFORMATION RECORDING MEDIUM FOR DISPLAYING AND SCROLLING OBJECTS ON A DISPLAY

(75) Inventor: Munetaka Tsuda, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 90 days.

(21) Appl. No.: 12/439,082

(22) PCT Filed: Dec. 11, 2007

(86) PCT No.: PCT/JP2007/073826
§ 371 (c)(1),
(2), (4) Date: Dec. 1, 2009

(87) PCT Pub. No.: WO2008/136151
PCT Pub. Date: Nov. 13, 2008

(65) Prior Publication Data
US 2010/0085380 A1   Apr. 8, 2010

(30) Foreign Application Priority Data

Apr. 24, 2007 (JP) .................. 2007-113772
Apr. 24, 2007 (JP) .................. 2007-113773

(51) Int. Cl.
*G09G 5/00* (2006.01)
*G06F 3/048* (2013.01)
(Continued)

(52) U.S. Cl.
CPC .............. *G06T 11/60* (2013.01); *G06F 3/0485* (2013.01)
USPC ........... 345/629; 345/672; 345/684; 345/686; 345/687; 345/688; 715/784; 715/785; 715/788

(58) Field of Classification Search
CPC ...... G06F 3/0484–3/0486; G06F 2203/04805; G06F 2203/04806; H04N 1/00196; H04N 1/00198; H04N 1/00458; G06T 11/60
USPC ......... 345/650, 672, 660–662, 684–688, 629; 902/810–845; 386/248; 715/781–801, 715/973
See application file for complete search history.

(56) References Cited

U.S. PATENT DOCUMENTS 6,297,836 B1 * 10/2001 Kurashina ..................... 345/684
6,366,295 B1 *  4/2002 Kurashina ..................... 345/684
(Continued)

FOREIGN PATENT DOCUMENTS

| EP | 1 761 051 | 3/2007 |
|---|---|---|
| JP | 798640 A | 4/1995 |

(Continued)

OTHER PUBLICATIONS

Supplementary European Search Report dated Apr. 7, 2011, from corresponding European Application No. EP 07 85 0392.

(Continued)

*Primary Examiner* — Xiao Wu
*Assistant Examiner* — Michael J Cobb
(74) *Attorney, Agent, or Firm* — Katten Muchin Rosenman LLP (57) ABSTRACT

To provide an image display device for displaying, when displaying a plurality of display targets while scrolling, the respective display targets in a manner that takes into consideration the sizes and scroll directions of the respective display targets. An image display device places a plurality of display targets on a virtual plane, instructs the size of a display area defined on a part of the virtual plane, displays an image showing a picture inside the display area, and moves at least either one of the display targets and display area along a predetermined direction set on the virtual plane, relative to the virtual plane, in which the respective display targets are placed so as to be included in an area which is a band area extending in the predetermined direction on the virtual plane, having a width corresponding to the instructed size of the display area, and partially overlapping the display area.

6 Claims, 6 Drawing Sheets

(51) Int. Cl.
*G06T 11/60* (2006.01)
*G06F 3/0485* (2013.01)

(56) References Cited

U.S. PATENT DOCUMENTS

| | | | |
|---|---|---|---|
| 6,738,075 B1* | 5/2004 | Torres et al. | 715/723 |
| 7,437,005 B2* | 10/2008 | Drucker et al. | 382/224 |
| 8,042,063 B1* | 10/2011 | Lin-Hendel | 715/838 |
| 8,276,098 B2* | 9/2012 | Fagans et al. | 715/811 |
| 2002/0135621 A1* | 9/2002 | Angiulo et al. | 345/838 |
| 2003/0026594 A1* | 2/2003 | Shiiyama | 386/69 |
| 2003/0210281 A1* | 11/2003 | Ellis et al. | 345/838 |
| 2004/0143598 A1* | 7/2004 | Drucker et al. | 707/104.1 |
| 2004/0175764 A1* | 9/2004 | Nishiyama et al. | 435/7.2 |
| 2004/0186820 A1* | 9/2004 | Izume et al. | 707/1 |
| 2005/0091599 A1* | 4/2005 | Yamakado et al. | 715/732 |
| 2005/0160375 A1* | 7/2005 | Sciammarella et al. | 715/838 |
| 2005/0188326 A1* | 8/2005 | Ikeda | 715/788 |
| 2005/0192924 A1* | 9/2005 | Drucker et al. | 707/1 |
| 2005/0210414 A1* | 9/2005 | Angiulo et al. | 715/838 |
| 2006/0050337 A1* | 3/2006 | Hitaka et al. | 358/537 |
| 2006/0132447 A1* | 6/2006 | Conrad | 345/168 |
| 2007/0143129 A1* | 6/2007 | Chiu | 705/1 |
| 2008/0113817 A1* | 5/2008 | Murray et al. | 463/43 |
| 2008/0317386 A1* | 12/2008 | Wood et al. | 382/307 |
| 2009/0003731 A1* | 1/2009 | Nitta et al. | 382/298 |

FOREIGN PATENT DOCUMENTS

| | | | |
|---|---|---|---|
| JP | 8-123816 A | | 5/1996 |
| JP | 8-123973 | | 5/1996 |
| JP | 2004-289425 | | 10/2004 |
| JP | 2005-202635 | | 7/2005 |
| JP | 2005-275034 | | 10/2005 |
| JP | 2005275034 A | * | 10/2005 |
| JP | 2006186505 A | | 7/2006 |
| JP | 2006195804 | | 7/2006 |
| JP | 2006-244051 | | 9/2006 |

OTHER PUBLICATIONS

International Preliminary Report on Patentability and the Written Opinion of the International Searching Authority dated Nov. 19, 2009, from the corresponding International Application.
Kaori Toma. Acrobat 7.0 Super Reference for Windows & Macintosh, 1st Edition, Sotechsha Co., Ltd., Feb. 20, 2005, pp. 155-156.
International Search Report dated Mar. 18, 2008 from the corresponding PCT/JP2007/073826.
Japanese Office Action dated Apr. 27, 2012, from corresponding Japanese Application No. 2007-113773.
Japanese Office Action dated Nov. 29, 2011, from corresponding Japanese Application No. 2007-113773.
Kaori Hokama. "Acrobat 7.0 Super reference for Windows & Macintosh", First Edition, pp. 155-156, Feb. 20, 2005, Sotec., Ltd.
Japanese Office Action dated Feb. 21, 2012, from corresponding Japanese Application No. 2007-113772.

* cited by examiner

IMAGE DISPLAY DEVICE, IMAGE DISPLAY METHOD AND INFORMATION RECORDING MEDIUM FOR DISPLAYING AND SCROLLING OBJECTS ON A DISPLAY

TECHNICAL FIELD

The present invention relates to an image display device, an image display method, and an information storage medium for displaying a plurality of display targets.

BACKGROUND ART

There is available an image display device for showing a plurality of display targets, such as a photographic image captured by a user using a still camera, on a screen. Some of the image display devices may show the respective display targets on the screen, while sequentially changing the display targets shown on the screen (see, e.g., Patent Document 1). As an example method for realizing such display, there is available a method for displaying an image showing a picture inside a display area defined on a virtual plane where a plurality of display targets are arranged in a predetermined pattern. In this case, at least either one of the respective display targets and display area is scrolled along a predetermined direction, whereby the respective display targets on the screen are scrolled so that a plurality of display targets are sequentially displayed. Patent Document 1: Japanese Patent Laid-open Publication No. 2006-186505

DISCLOSURE OF THE INVENTION

Problems to be Solved by the Invention

However, according to the above described conventional technique, as the relative size of the display area relative to the respective display targets is changed when it is desired to enlarge or reduce the display target on the screen, or the like, the display target may resultantly become no longer included in the display area so that all display targets are not shown.

In addition, according to the above described conventional technique, as the display target is changed even when the user does not instruct to do so, the user, paying attention to one display target shown on the screen, is required to make an explicit instruction to stop the change in order to keep the display target shown.

The present invention has been conceived in view of the above, and one of the objects of the present invention is to provide an image display device, an image display method, and an information storage medium for displaying, when displaying, while scrolling, a plurality of display targets, the display targets in a manner that takes into consideration the sizes and scroll directions of the respective display targets.

Another object of the present invention to provide an image display device, an image display method, and an information storage medium for improving operability when displaying, while sequentially changing, a plurality of display targets.

Means for Solving the Problems

In order to achieve the above described objects, according to one aspect of the present invention, there is provided an image display device, comprising placing means for placing a plurality of display targets on a virtual plane; instructing means for instructing a size of a display area defined on a part of the virtual plane; image display means for displaying an image showing a picture inside the display area; and moving means for moving at least either one of the respective display targets and display area along a predetermined direction defined on the virtual plane, relative to the virtual plane, wherein the placing means places the respective display targets so as to be included in an area which is a band area extending in the predetermined direction on the virtual plane, having a width corresponding to the size instructed by the instructing means, of the display area, and at least partially overlapping the display area.

In the above, the placing means may place the respective display targets according to one placement pattern selected from among a plurality of placement patterns which respectively have different widths of the band area, according to the instructed size of the display area.

Further, when one placement pattern is changed to another placement pattern among the plurality of placement patterns according to an instruction to change the size of the display area, the placing means, using as a reference, one display target which is determined based on a position of the display area and the respective display targets on the virtual plane when the instruction is issued, may move a display target other than the one display target according to the other placement pattern, to thereby again place the respective display targets.

Further, the plurality of placement patterns may be respectively associated with a plurality of ranges of the size of the display area, and the placing means may place the respective display targets according to a placement pattern associated with a range which includes the instructed size of the display area, among the plurality of ranges.

Further, the display target may be an image of a predetermined size, and the plurality of placement patterns may be placement patterns in each of which a different number of display targets are placed in a direction intersecting the predetermined direction on the virtual plane, the number being determined according to the predetermined size and the width of the band area.

According to another aspect of the present invention, there is provided an image display method, comprising a placing step of placing a plurality of display targets on a virtual plane; an instructing step of instructing a size of a display area defined on a part of the virtual plane; an image display step of displaying an image showing a picture inside the display area; and a moving step of moving at least either one of the respective display targets and display area along a predetermined direction defined on the virtual plane, relative to the virtual plane, wherein at the placing step, the respective display targets are placed so as to be included in an area which is a band area extending in the predetermined direction on the virtual plane, having a width corresponding to the size instructed at the instructing step, of the display area, and at least partially overlapping the display area.

According to another aspect of the present invention, there is provided a computer readable information storage medium storing a program for causing a computer to function as placing means for placing a plurality of display targets on a virtual plane; instructing means for instructing a size of a display area defined on a part of the virtual plane; image display means for displaying an image showing a picture inside the display area; and moving means for moving at least either one of the respective display targets and display area along a predetermined direction defined on the virtual plane, relative to the virtual plane, wherein the placing means places the respective display targets so as to be included in an area which is a band area extending in the predetermined direction on the virtual plane, having a width corresponding to the size instructed by the instructing means, of the display area, and at least partially overlapping the display area.

According to another aspect of the present invention, there is provided an image display device comprising image display means for displaying an image showing at least one of a plurality of display targets; target changing means for sequentially changing the display target shown by the image; and restriction means for restricting, when change of a magnification ratio for the display target shown by the image is instructed, change of the display target by the target changing means according to an instructed magnification ratio.

In the above, the image display device may further comprise placing means for placing the plurality of display targets on a virtual plane, wherein the image display means may display an image showing a picture inside a display area defined on a part of the virtual plane and including at least one of the plurality of display targets placed, the target changing means may move at least either one of the respective display targets and display area along a predetermined direction defined on the virtual plane, relative to the virtual plane, to thereby change the display targets, and the restriction means may restrict movement of the respective display targets or the display area relative to the virtual plane, to thereby restrict change of the display targets.

In the above, the restriction means may move the display area or the respective display targets to a position which is determined based on a position of the display area and the respective targets on the virtual plane at a time of receiving the instruction, and then stop movement of the display area or the respective display targets.

In the above, the restriction means, when change of the magnification ratio to a value equal to or larger than a predetermined value is instructed, may restrict change of the display targets by the target changing means.

In the above, the restriction means, when change of the magnification ratio to a value smaller than the predetermined value is instructed, may release restriction of the change of the display targets.

According to another aspect of the present invention, there is provided an image display device, comprising means for displaying an image showing a picture in which a plurality of display targets sequentially move on a screen; and means for stopping, when change of a magnification ratio for a display target shown by the image is instructed, movement of the display targets on the screen according to an instructed magnification ratio.

According to another aspect of the present invention, there is provided an image display method comprising an image display step of displaying an image showing at least one of a plurality of display targets; a target changing step of sequentially changing the display target shown by the image; and a restriction step of restricting, when change of a magnification ratio for the display target shown by the image is instructed, change of the display target at the target changing step according to an instructed magnification ratio.

According to another aspect of the present invention, there is provided a computer readable information storage medium storing a program for causing a computer to function as image display means for displaying an image showing at least one of a plurality of display targets; target changing means for sequentially changing the display target shown by the image; and restriction means for restricting, when change of a magnification ratio for the display target shown by the image is instructed, change of the display target by the target changing means according to an instructed magnification ratio instructed.

BEST MODE FOR CARRYING OUT THE INVENTION

In the following, one embodiment of the present invention will be described with reference to the accompanying drawings.

Figure 1:
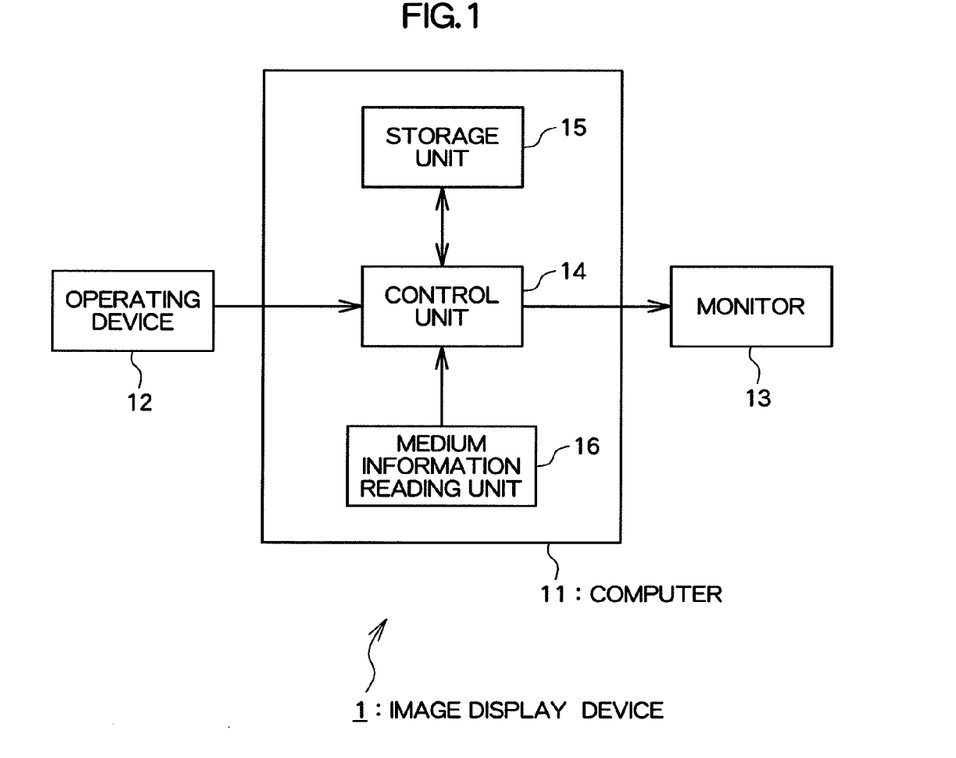
FIG. 1 is a block diagram showing an example of a structure of an image display device according to an embodiment of the present invention.

As shown in FIG. 1, an image display device 1 according to an embodiment of the present invention comprises a computer 11, an operating device 12, and a monitor 13.

The computer 11 may be, e.g., a consumer game device, a personal computer, and so forth, and comprises a control unit 14, a storage unit 15, and a medium information reading unit 16.

The control unit 14 comprises a CPU, and so forth, and carries out various information processes according to a program stored in the storage unit 15.

The storage unit 15 comprises a memory element such as a RAM, a ROM, and so forth, and/or a hard disk, or the like, and stores a program to be executed by the control unit 14. The program may be provided stored in various information storage media such as, e.g., a CD-ROM, a DVD-ROM, and so forth, or provided via a communication network, such as the Internet, or the like. The storage unit 15 may function as a working memory of the control unit 14.

The medium information reading unit 16 reads information stored in an information storage medium, such as a CD-ROM, a DVD-ROM, a memory card, and so forth. In this embodiment, the medium information reading unit 16 reads data about a plurality of photographic images to be shown on the monitor 13 from the information storage medium.

Figure 2:
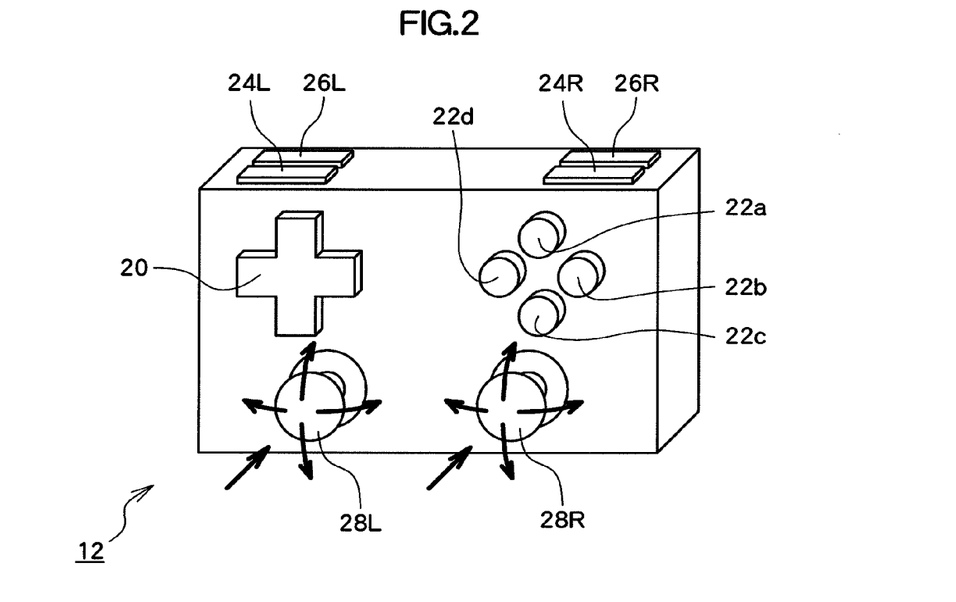
FIG. 2 is a perspective view showing an example of the external appearance of an operating device.

The operating device 12 receives a user's instruction operation, and outputs operation data describing the content of the operation to the control unit 14 of the computer 11. FIG. 2 is a perspective view showing one example of the external appearance of the operating device 12. The shown operating device 12 has a cross key 20 and an operating stick 28L on the left side of the front surface thereof, and buttons 22a to 22d and an operating stick 28R on the right side of the same. The operating sticks 28L and 28R stand on the front surface of the operating device 12, and are adapted to incline in any direction, so that data describing the inclination direction is input as operation data into the computer 11. Also, the operating sticks 28L and 28R are to be pressed towards the front surface of the operating device 12, and data describing whether or not the respective operating sticks 28L and 28R are pressed is input as operation data to the computer 11.

The operating device 12 is adapted to use by the user holding right and left ends thereof by their two hands and operating the cross key 20 and operating stick 28L, using their left thumb, and pressing the buttons 22a to 22d and operating the operating stick 28R, using their right thumb. Buttons 24L and 26L are formed on the left side of the top surface of the operating device 12, and buttons 24R and 26R are formed on the right side of the same, so that the user can press the button 24L and button 26L, using their left index finger, and the button 24R and button 26R, using their right index finger.

The monitor 13 comprises, e.g., a home-use television set receiver, and so forth, and shows an image on the screen thereof, based on a video signal input from the computer 11.

In the following, a function to be realized by the image display device 1 will be described. The image display device 1 in this embodiment shows on the monitor 13 a plurality of photographic images described by the data read by the medium information reading unit 16, in a method to be described below.

The image display device 1 carries out predetermined image processing relative on each of the image data read by the medium information reading unit 16, to thereby produce a display photographic image. The image processing may include a process to enlarge or reduce a photographic image to a predetermined size.

The photographic images are arranged according to a placing order which is determined based on a predetermined criterion, thereby constituting an image sequence C. For example, the placing order of the image sequence C may be the order of dates when the respective photographic images are captured or the file names given to the data of the respective photographic images. It should be noted that, in arranging the photographic images according to an image capturing date order, the images constituting the image sequence C may include a date indicative image indicating a date, in addition to the photographic images. The date indicative image is an image indicating a date when each photographic image is captured, and is inserted immediately before the photographic image or images taken on the same date in the image sequence C. In the following, the respective images constituting the image sequence C are referred to as display target images.

Figure 3:
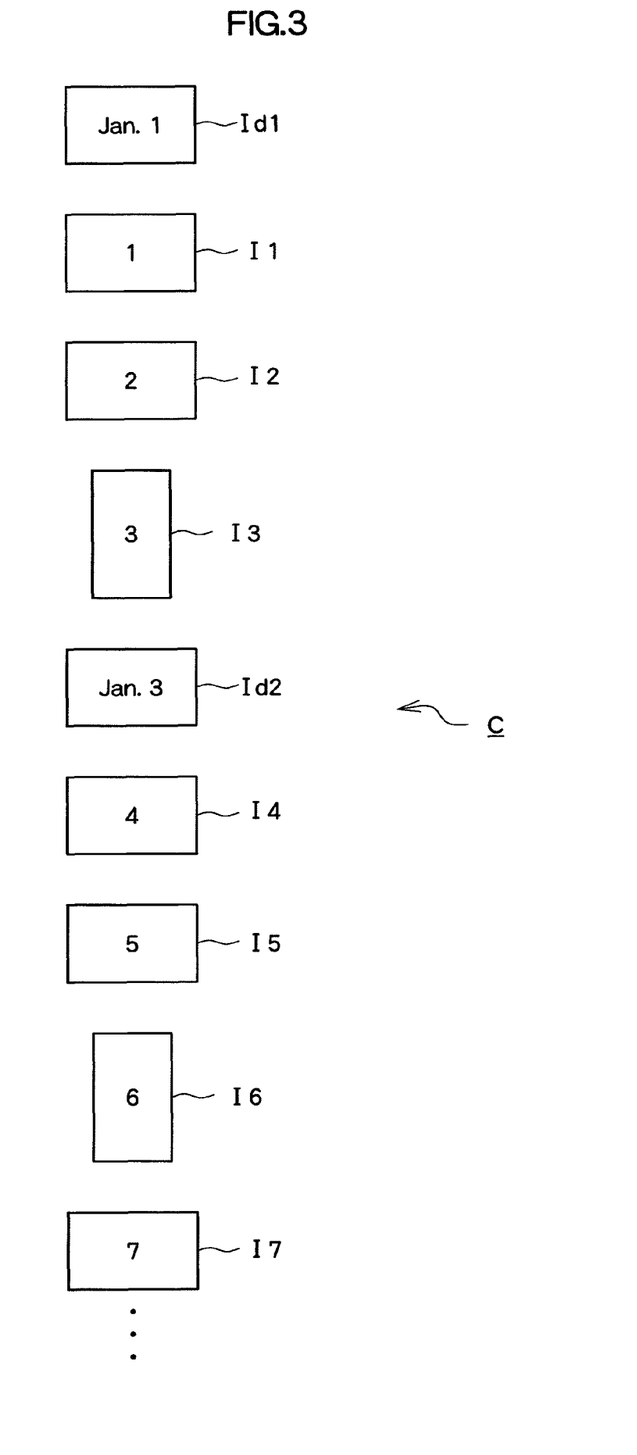
FIG. 3 is a drawing showing one example of an image sequence, or a display target, in an embodiment of the present invention.

As a specific example, the first seven photographic images according to the image capturing date order among those read from the medium information reading unit 16 are defined as photographic images I1, I2, I3, I4, I5, I6, and I7, in which the photographic images I1, I2, and I3 are captured on January $1^{st}$, and the photographic images I4, I5, I6, and I7 are captured on January $3^{rd}$. In this case, the first nine images among those constituting the image sequence C are a date indicative image Id1 of January $1^{st}$, the photographic images I1, I2, I3, a date indicative image Id2 of January $3^{rd}$, the photographic images I4, I5, I6, and I7 in order, as shown in FIG. 3.

Figure 4:
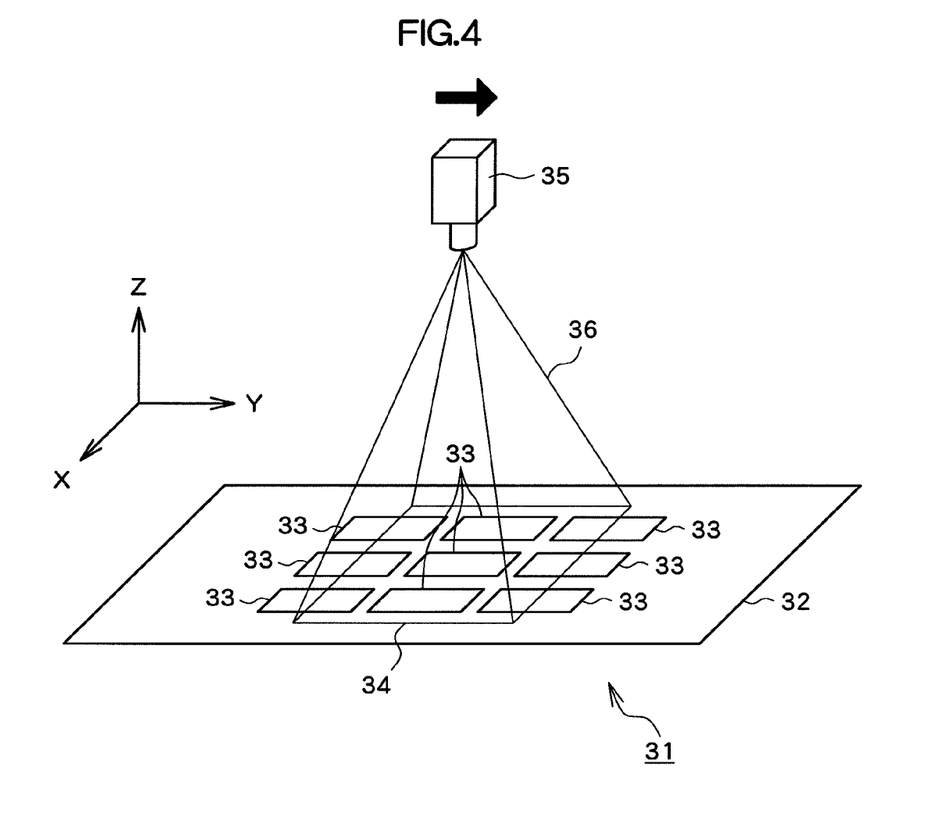
FIG. 4 is a diagram explaining one example of a virtual three dimensional space.

In the image display device 1, a virtual three dimensional space 31 is created. FIG. 4 is a diagram showing one example of the virtual three dimensional space 31. As shown in FIG. 4, a virtual plane 32 is set in the virtual three dimensional space 31. In the example shown in FIG. 4, the virtual plane 32 is a flat surface perpendicular to the z axis of the virtual three dimensional space 31 and parallel to the x and y axes of the same.

A plurality of image objects 33 are placed in a predetermined pattern on the virtual plane 32. Each image object 33 is a rectangular flat object having a predetermined size, and on the surfaces of the respective image objects 33, the display target images included in the above described image sequence C are pasted as textures.

In the virtual three dimensional space 31, a display area 34 is defined, which is an area on the virtual plane 32, occupying a part of the virtual plane 32. The display area 34 is defined according to a viewpoint 35 arranged in the virtual three dimensional space 31 and a viewing angle 36 defined with respect to the viewpoint 35. The viewpoint 35 is arranged at a position in the z axial positive direction viewed from the virtual plane 32, as shown in FIG. 4, and the relevant viewing direction is defined directed in the z axial negative direction (that is, toward the virtual plane 32). The area on the virtual plane 32 within the viewing angle 36 when viewed from the viewpoint 35 in the viewing direction constitutes the display area 34. In this example, as the viewpoint 35 moves in the direction parallel to the virtual plane 32, with the viewing angle 36 fixed, the display area 34 moves on the virtual plane 32.

The image display device 1 moves at least either one of the respective image objects 33 and the display area 34 relative to the virtual plane 32 along a predetermined scroll direction (the y axial direction, here) set on the virtual plane 32, as will be described later. Then, with the movement continuing, a process to produce an image showing a picture within the display area 34 and to show the produced image on the monitor 13 is repetitively carried out. With the above, a plurality of photographic images are shown on the screen of the monitor 13, while being scrolled as time passes.

Figure 5:
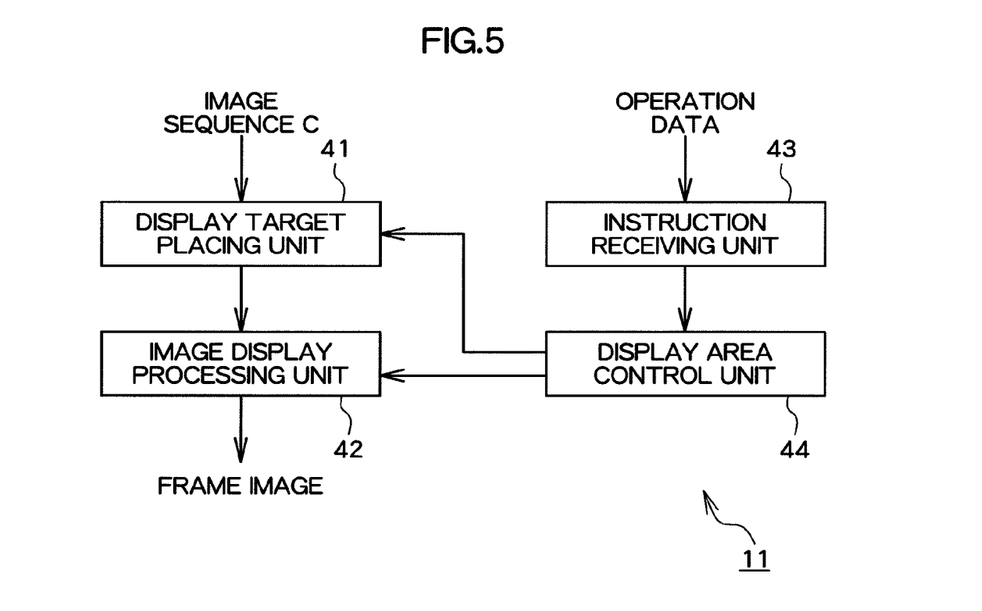
FIG. 5 is a functional block diagram showing an example of a function to be realized by a computer included in the image display device according to an embodiment of the present invention.

FIG. 5 is a functional block diagram of the computer 11 constituting the image display device 1. As shown in the drawing, the computer 11 comprises, in terms of functions, a display target placing unit 41, an image display processing unit 42, an instruction receiving unit 43, and a display area control unit 44. These functions are realized by the control unit 14 by executing a program stored in the storage unit 15.

The display target placing unit 41 places a plurality of image objects 33 having display target images pasted thereon on the virtual plane 32. In the initial state, the display target placing unit 41 places the image objects 33 in a placement pattern in which the display target images forming the image sequence C are arranged in three lines in the y axial direction. In this placement pattern, the three image objects 33 sequentially placed in the image sequence C are arranged along the x axial direction (the direction perpendicular to the scroll direction on the virtual plane 32) on the virtual plane 32, and this composition of three image objects 33 is repetitively placed along the y axial direction (the scroll direction). Note that, the orientation (lengthwise or widthwise) with which the respective image objects 33 are placed is determined based on the orientation of the display target images pasted on the respective image objects 33. That is, an image object 33 having a portrait image pasted thereon is placed with the orientation in which the longer side of the rectangular is parallel to the x axis, while an image object 33 having a landscape image or date indicative image pasted thereon is placed with the orientation in which the longer side of the rectangular is parallel to the y axis.

Figure 6:
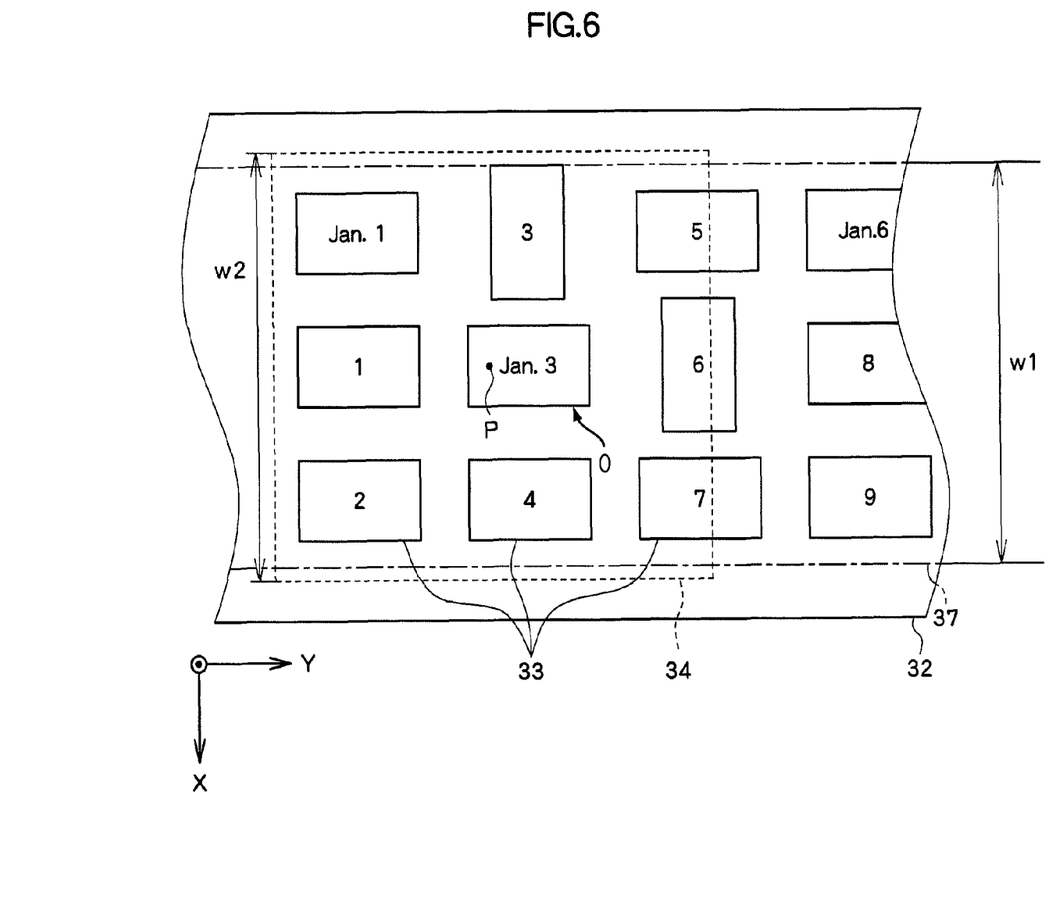
FIG. 6 is a drawing showing one example of a placement pattern of image objects placed on a virtual plane.

FIG. 6 is a diagram explaining one example of the virtual plane 32 where image objects 33 having respective display target images forming the image sequence C, shown as an example in FIG. 3, pasted thereon are placed. In the example shown in FIG. 6, the respective image objects 33 are placed so as to be included within a predetermined placement area 37 (the area enclosed by the alternate long and short dash line in the drawing). The placement area 37 is a band area extending in the scroll direction on the virtual plane 32, having a width w1 corresponding to the size of the display area 34, and partially overlapping the display area 34. Specifically, for example, the width w1 of the placement area 37 has a value not exceeding the initial value of the width w2 in the x axial direction of the display area 34. The number of image objects 33 to be placed on the virtual plane 32 along the x axial direction is fixed to three so that all image objects 33 are placed so as to be included within the width w1 of the placement area 37, irrespective of the orientation, either lengthwise or widthwise, with which the image object 33 having a predetermined size is placed.

In response to an instruction to change the size of the display area 34, to be described later, the display target placing unit 41 carries out a process to change the placement pattern of the image objects 33. A specific example of a placement pattern changing process will be described later.

The image display processing unit 42 produces an image (a frame image) showing a picture inside the display area 34 every predetermined period of time, and renders into a predetermined frame image rendering memory. The image rendered in the frame image rendering memory is converted into a video signal, then output to the monitor 13, and shown on the screen of the monitor 13. As the display area 34 overlaps at least a part of the placement area 37 where the image object 33 is placed, as described above, the frame image results in an image showing at least one of the plurality of display target images (a display target).

In the above, an image display processing unit 42 enlarges or reduces the image within the display area 34 to a predetermined size, irrespective of the size of the display area 34 on the virtual plane 32, to thereby form a frame image. With the above, when the display area control unit 44 enlarges the display area 34 to be described later, the display target image within the frame image resultantly becomes smaller, and when the display area control unit 44 reduces the size of the display area 34, the display target image within the frame image resultantly becomes larger.

The instruction receiving unit 43 receives the user's instruction operation relative to the operating device 12. In this embodiment, the user, by operating the operating device 12, instructs to change the magnification or reduction ratio for the display target image shown inside the frame image. As a specific example, the user, by moving the cross key 20 upward or operating stick 28L, instructs to enlarge the display target image, and by moving the same downward, instructs to reduce the size of the display target image. In the above, an extent by which to change the magnification or reduction ratio is determined according to the duration with the upward or downward operation continues. That is, with the user continuing the upward or downward operation, the magnification or reduction ratio for the display target image is gradually changed.

Further, the user may instruct to change the scroll direction and/or speed of the display target image. As a specific example, with the cross key 20 or operating stick 28L operated rightward, acceleration of the scroll speed is instructed, and with the cross key 20 or operating stick 28L operated leftward, deceleration of the scroll speed is instructed. Further, with the cross key 20 or operating stick 28L kept operated leftward for more than a predetermined period of time, the scroll direction may be changed from leftward to rightward. Note that the user's instructed direction in the above corresponds to the movement of the viewpoint 35. That is, the moving direction or speed of the viewpoint 35 are changed to a direction in accordance with the direction instructed by the user, and the respective display target images on the screen obtain acceleration in the direction opposite from the direction instructed by the user.

The instruction receiving unit 43 outputs operation data describing the content of the user's operation as an instruction concerning the size of the display area or an instruction to move the display area to the display area control unit 44.

The display area control unit 44 moves the position of the viewpoint 35 in the virtual three dimensional space 31 to thereby control the position and size of the display area 34. Specifically, the display area control unit 44 updates the position and size of the display area 34 on the virtual plane 32 every predetermined period of time according to the predetermined moving direction and speed of the viewpoint 35 and the user's instruction operation received by the instruction receiving unit 43.

In the following, a specific example of the control of the display area 34 by the display area control unit 44 will be described. Initially, the display area control unit 44 continuously moves the viewpoint 35 in the y axial positive direction at a predetermined moving speed while no explicit instruction is issued from the user. Accompanying this movement, the display area 34 moves in the y axial positive direction on the virtual plane 32, so that the respective image objects 33 placed on the virtual plane 32 sequentially move passing through the display area 34 in the y axial negative direction. By displaying an image showing a picture inside the display area 34 on the monitor 13, an image is shown on the screen of the monitor 13 in the manner described below when the respective image objects 33 are placed on the virtual plane 32 in the placement pattern shown in, e.g., FIG. 6. That is, the date indicative image Id1, photographic image I1, and photographic image I2, aligned in a column-wise direction, first enter the screen from the right side, when facing the screen, of the screen, and while the images Id1, I1, and I2 are being scrolled leftward on the screen, the subsequent photographic image I3, date indicative image Id2, and photographic image I4 enter the screen from the right side, when facing the screen, of the screen. In this manner, the image display device 1 sequentially changes the display target images shown in the frame image even when the user does not issue an instruction operation for the operating device 12.

It should be noted that although it is described in the above that the display area 34 is moved in the scroll direction, the respective image objects 33 placed on the virtual plane 32 may be moved in the scroll direction on the virtual plane 32, in addition to or in place of the movement of the display area 34.

Further, the display area control unit 44 changes the size, moving speed, and moving direction of the display area 34 according to the user's instruction operation received by the instruction receiving unit 43, and updates the position of the display area 34 on the virtual plane 32 according to the change. As a specific example, upon receipt of an instruction to change the scroll direction or speed of the display target, input from the instruction receiving unit 43, the display area control unit 44 accordingly changes the moving speed or direction of the viewpoint 35 along the y axial direction. With the above, the moving speed or direction of the display area 34 on the virtual plane 32 is changed, and the scroll speed or direction of the respective display target images in the frame image is also changed. Note that a process to be carried out in response to an instruction to change a magnification ratio for the display target image will be described below.

In the following, a specific example of a process to be carried out by the image display processing unit 43 to change the size of the display area 34 and a process to be carried out by the display target placement unit 41 to change the placement pattern upon receipt by the instruction receiving unit 43 when the user's instruction to enlarge or reduce the display target image is received will be described.

Initially, suppose that the respective image objects 33 are placed on the virtual plane 32 in the placement pattern shown as an example in FIG. 6, when the image display device 1 begins displaying the display target images. When the user's instruction to enlarge the display target image in the frame image is input from the instruction receiving unit 43 in the above, the display area control unit 44 carries out a process to reduce the size of the display area 34.

Specifically, the display area control unit 44 moves the viewpoint 35 in the z axial negative direction (that is, in the viewing direction) to thereby reduce the height h between the viewpoint 35 and the virtual plane 32 (that is, the distance between the viewpoint 35 and the virtual plane 32). With the above, as the viewpoint 35 approaches the virtual plane 32, while keeping the viewing angle 36, the display area 34 on the virtual plane 32 becomes smaller. Accordingly, the image showing a picture inside the display area 34 is enlarged by the image display processing unit 42 to a predetermined size, as described above, and the display target image in the frame image is shown enlarged on the screen of the monitor 13.

On the other hand, when the user's instruction to reduce the size of the display target image in the frame image is input from the instruction receiving unit 43, the display area control unit 44 carries out a process to enlarge the display area 34. Specifically, the viewpoint 35 is moved in the z axial positive direction to thereby extend the height h of the viewpoint 35. With the above, the display area 34 on the virtual plane 32 becomes larger, and the display target images pasted on the respective image objects 33 in the display area 34 are accordingly shown smaller on the screen of the monitor 13.

The display area control unit 44 may change the speed at which the viewpoint 35 moves along the y axial direction, in response to the user's instruction to change the magnification or reduction ratio for the display target image. As a specific example, the display area control unit 44 changes the height h of the viewpoint 35 in response to the user's instruction, as described above, then calculates the moving speed of the viewpoint 35 along the y axial direction, based on the moving speed determined as a function of the height h, and moves the viewpoint 35 at the calculated moving speed. With the above, by controlling, e.g., such that the scroll speed becomes slower as the display target image becomes smaller, it is possible to make it easier for the user to view the respective display target images.

Further, when the user continues the instruction to enlarge the display target image with the respective image objects 33 placed on the virtual plane 32 in the placement pattern, shown as an example in FIG. 6, so that the image display processing unit 43 gradually reduces the size of the display area 34, the image objects 33 placed in a line other than the middle line of the three lines on the virtual plane 32 come to be not fully included in the display area 34. Then, when the display area 34 finally becomes equal to or smaller than a predetermined size (that is, the height h of the viewpoint 35 has become equal to or smaller than a predetermined value) in response to the user's instruction received by the instruction receiving unit 43, the display target placing unit 41 places again the image objects 33.

Specifically, the display target placing unit 41 selects one placement pattern from among a plurality of placement patterns according to an instructed size of the display area 34, and again places the respective image objects 33 in the selected placement pattern. Here, assume that the plurality of placement patterns each have a different width w1 of the placement area 37 and define the positions of the respective image objects 33 such that the image objects 33 are all included in the placement area 37. For example, each placement pattern may be a placement pattern in which the number of image objects 33 are arranged on the virtual plane 32 in a predetermined direction (the x axial direction, here) intersecting the scroll direction, the number being different from the respective placement patterns and defined according to the size of the respective image object 33 and the width w1 of the placement area 37.

Further, assume that the plurality of placement patterns are respectively associated with any of a plurality of ranges of the size of the display area 34 in this embodiment. In this case, in response to the user's instruction to enlarge the display target image (that is, an instruction to change the size of the display area 34), the display target placing unit 41 places again the image objects 33 in a placement pattern associated with the range which includes the instructed size of the display area 34, among the plurality of ranges. In this case, association between the numeric value range and a placement pattern is defined such that, e.g., the value of the width w1 of the placement area 37 in each placement pattern does not exceed a value obtained by multiplying the width w2 in the x axial direction of the display area 34 by a predetermined coefficient.

In order to realize selection of this placement pattern, the computer 11 carries out, e.g., a process described below. That is, the display area control unit 44 initially changes the height h of the viewpoint 35 according to the user's instruction received by the instruction receiving unit 43, as described above, and depending on which numeric value range among a plurality of predetermined numeric value ranges includes the value of the height h into which the height h has been changed by the display area control unit 44, the display target placing unit 41 selects one placement pattern associated with the numeric value range which includes the changed height h among a plurality of predetermined placement patterns.

With a new placement pattern selected, the display target placing unit 41 carries out the process to be described below to move the respective image objects 33 along a predetermined movement path within the virtual three dimensional space 31, whereby the image objects 33 arranged in the current placement pattern are changed to be arranged in the selected placement pattern. For this purpose, or in order to decide the positions of the respective image objects 33 in the new placement pattern, the display target placing unit 41 initially determines a focused object O to be used as a reference from among the image objects 33 placed on the virtual plane 32.

The focused object O is determined, e.g., as follows according to the position of the display area 34 on the virtual plane 32 and the positions of the respective image objects 33 on the virtual plane 32 at the time of receiving an instruction to change the size of the display area 34. Initially, the display target placing unit 41 specifies the position of the watched point P according to the position of the viewpoint 35 at the time of receiving the instruction. Note that the watched point P refers to a point at which the straight line extending from the viewpoint 35 in the viewing direction intersects the virtual plane 32. When the viewing direction coincides with the central direction of the viewing angle 36, the watched point P should coincide with the central point of the display area 34. Then, the display target placing unit 41 determines, as a focused object O, the image object 33, among the respective image objects 33 placed on the virtual plane 32, for which the representative point (e.g., the central point of the image object 33) would first come to overlap the watched point P when it is assumed that the display area control unit 44 will continue moving the viewpoint 35 along the y axial direction. Alternatively, in the case where the watched point P is already overlapping any image object 33 at the time of receiving the instruction, the image object 33 may be determined as the focused object O, even though the watched point P has already passed over the representative point P of the image object 33.

When an instruction to change the size of the display area 34 to equal to or smaller than a predetermined size is received at a time when the display area 34 is located in the position indicated by, e.g., the broken line in the example of the virtual plane 32 shown in FIG. 6, the watched point P is determined as indicated in the drawing, and the image object 33 having the date indicative image Id2 pasted thereon is specified as a focused object O.

Further, the display target placing unit 41 moves another image object, using the determined focused object O as a reference, according to the newly selected placement pattern. In the above, the display target placing unit 41 determines the movement destinations and paths for the respective image objects 33, according to the positions of the respective image objects 33 relative to the focused object O. For example, with the image objects 33 placed in the placement pattern shown in FIG. 6, the display target placing unit 41 again places the respective image objects 33 in the placement pattern shown in FIG. 7, upon receipt of an instruction to change the size of the display area 34 to a predetermined value or smaller. In the example shown in FIG. 7, the position of the focused object O on the virtual plane 32 remains unchanged, and the positions of the respective image objects 33 placed around the focused object O are moved from the positions defined in the placement pattern shown in FIG. 6 to those defined in the placement pattern shown in FIG. 7.

In the above, the respective image objects 33 do not necessarily move along a straight line on the virtual plane 32, and may move along a curved movement path in the virtual three dimensional space 31 so as to avoid collision against each other. Further, as an image object 33 located away from the focused object O by a distance equal to or longer than a predetermined distance determined depending on the size of the display area 34 is expected to stay outside, or not be included in, the display area 34 for a predetermined period of time, such an image object 33 may be simply placed again at a position determined based on the new placement pattern, rather than being considered as an object to be moved within the virtual three dimensional space 31.

Figure 7:
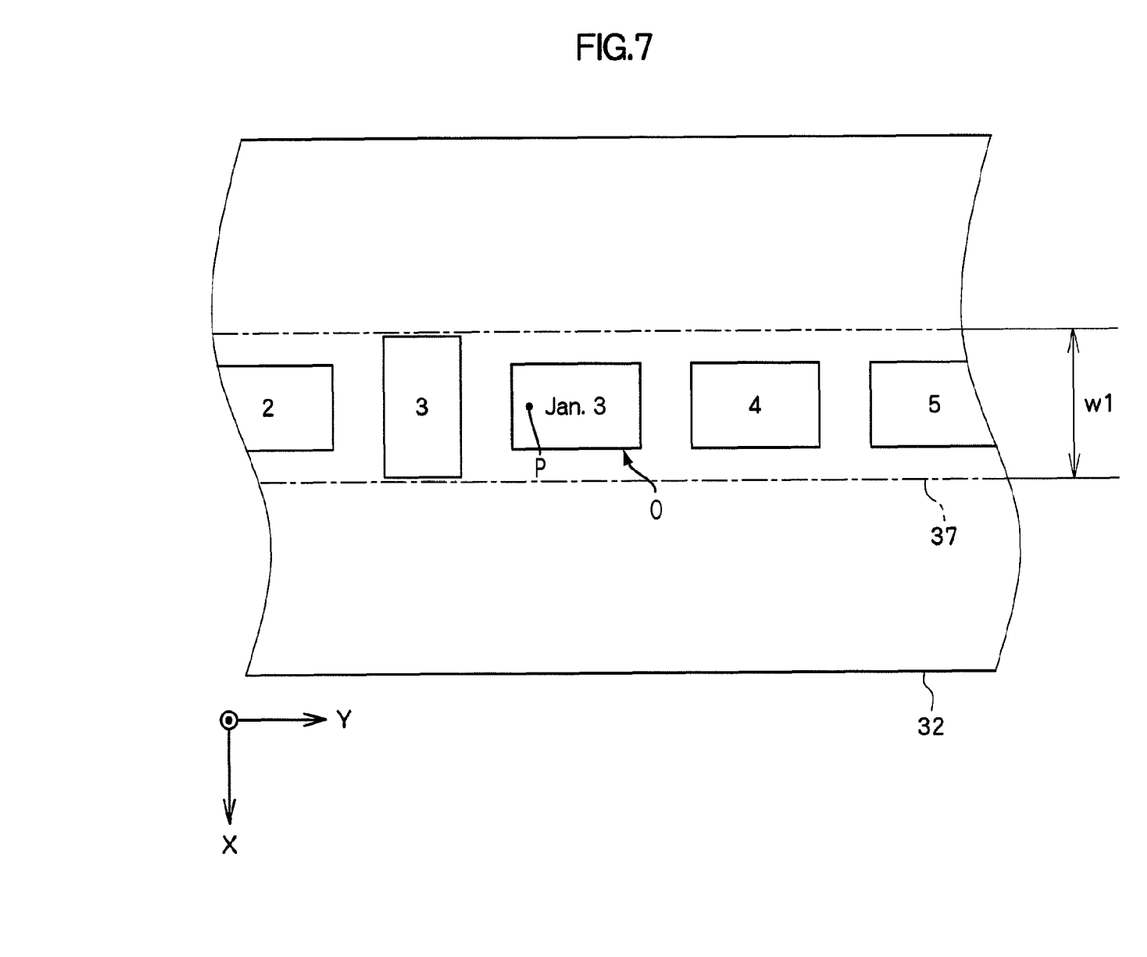
FIG. 7 is a drawing showing another example of a placement pattern of the image objects placed on the virtual plane.

In the placement pattern shown in FIG. 7, the respective image objects 33 are arranged in a single line along the y axial direction, and the display target images pasted on the respective image objects 33 are arranged according to the placing order of the image sequence C in the y axial positive direction. According to the placement pattern shown in FIG. 7, the respective image objects 33 are placed so as to be included in the placement area 37 having the width w1 which is substantially one third of that of the placement pattern shown in FIG. 6. This arrangement can prevent the display target image from being partially excluded from the monitor 13 when the image showing a picture inside the display area 34 is shown on the monitor 13 while thereafter moving the display area 34 in the y axial positive direction.

Figure 8:
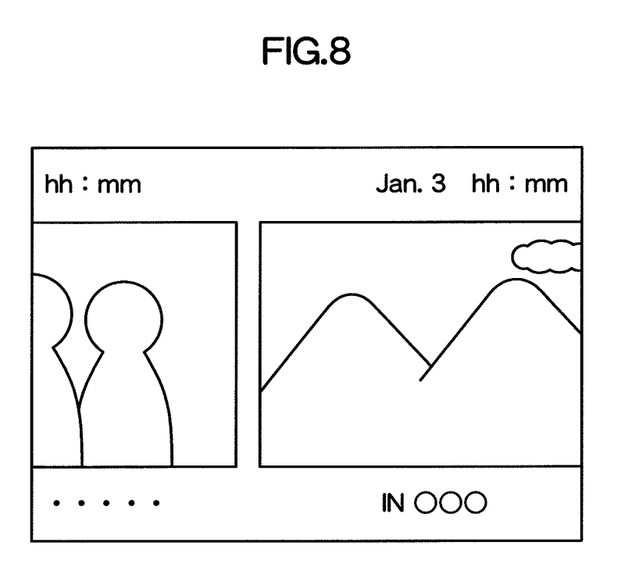
FIG. 8 is a drawing showing one example of an image shown on a monitor.

Further, as some margin results above and below the respective image objects 33 within the display area 34 (that is, positions in the y axial positive and negative directions relative to the respective image objects 33) immediately after the display target placing unit 41 changes the placement of the image objects 33 from the placement pattern shown in FIG. 6 to that shown in FIG. 7, an image depicting information concerning the photographic image pasted on the respective image object 33 may be placed in the marginal portion. For example, an image indicating a photographic image capturing date and/or a comment recorded by the user for each photographic image may be placed on the virtual plane 32 around the image object 33 having the photographic image pasted thereon. FIG. 8 is a diagram showing one example of a frame image showing a picture inside the display area 34 where such an image is placed.

When the user instructs to enlarge the display target image with such a frame image shown on the screen of the monitor 13, the display area control unit 44 carries out the control described below, according to the instructed magnification ratio. That is, when the size of the display area 34 satisfies a predetermined condition according to the instructed magnification ratio, the display area control unit 44 carries out a process to restrict the change of the display target image shown within the frame image.

As a specific example, when the display area control unit 44 moves the viewpoint 35 according to an instruction to enlarge the display target image, and the height h of the viewpoint 35 resultantly has become equal to or smaller than a predetermined value h1, the display area control unit 44 suspends the process to move the viewpoint 35 along the y axial direction (the scroll direction). With the above, the respective display target images having been scrolled thus far on the screen of the monitor 13 stop moving on the screen even if the user does not issue an explicit instruction to stop the scrolling. As described above, when the user instructs to change the magnification ratio for the display target image to a predetermined value or larger while the display target images are sequentially shown on the screen, the display target image that it is considered the user is paying attention to can be kept presented to the user by keeping the display target image shown on the screen at that moment in a state of being shown on the screen.

It should be noted that, when an instruction to change the magnification ratio to a predetermined value or larger is issued, the display area control unit 44 may move the display area 34 to a position which is determined based on the position of the display area 34 and the positions of the respective image objects 33 at the time of receiving the instruction, before stopping the moving display area 34, to thereby restrict the change of the display target image, instead of stopping the change of the display target image shown on the screen immediately after the receipt of the instruction.

As a specific example, the display area control unit 44 determines the focused object O in the manner as described above according to the position of the watched point P at the time of receiving an instruction to change the magnification ratio for the display target to a predetermined value or larger, then moves the viewpoint 35 along the y axial direction such that the representative point of the focused object O coincides with the watched point P, and stops the moving viewpoint 35 at a time when the representative point of the focused object O coincides with the watched point P. With the above, the display area control unit 44 can control the position of the display area 34 such that the scrolling is stopped with the display target image it is considered the user is paying attention to is located around the center of the screen of the monitor 13.

Figure 9:
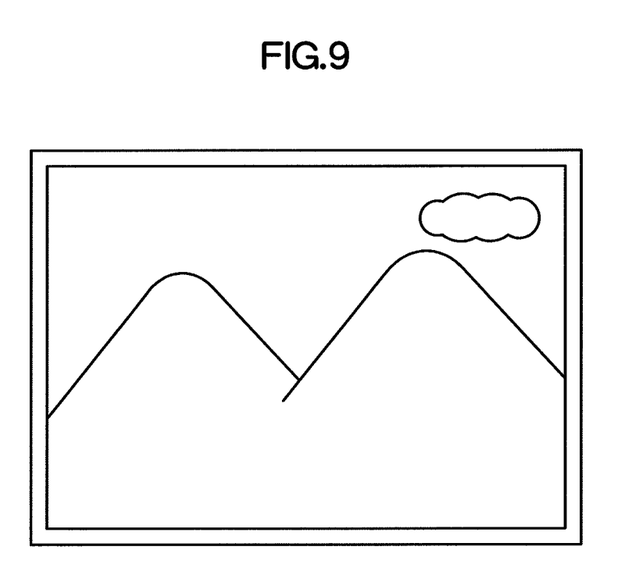
FIG. 9 is a drawing showing another example of an image shown on the monitor.

FIG. 9 shows an example of a frame image to be shown when the user operates the cross key 20 upward or operates operating stick 28L upwards while the frame image, shown as an example in FIG. 8, is shown and the image display device 1 thereupon carries out a process to enlarge the display target image and to restrict the scrolling. In the shown example, the image display device 1 initially moves the viewpoint 35 such that the display target image is located at the central of the display area 34, and then stops the scrolling.

When the user operates the cross key 20 upward or operates operating stick 28L upwards (that is, enlargement of the display target image shown on the screen is instructed), with the scrolling stopped, the display area control unit 44 moves the viewpoint 35 further in the z axial negative direction. When the display area 34, becoming much smaller in the above, has become small to an extent where the display area 34 no longer encompasses the entire focused object O, the image display device 1 shows enlarged a part of the display target image on the screen of the monitor 13.

When the user operates the operating stick 28R in any direction, with the scrolling stopped, the display area control unit 44 may move the viewpoint 35 within a flat surface parallel to the virtual plane 32 according to the direction instructed by the user, to thereby change the position of the display area 34 on the virtual plane 32. For example, with the user operating the operating stick 28R either rightward or leftward, the viewpoint 35 moves along the y axial direction so that the display target image shown on the screen of the monitor 13 is switched to the display target image pasted on the image object 33 on the right or left side of the focused object O. With the above, even when an image object 33 different from that which the user intends is selected as a focused object O and the scrolling is then stopped, the user can change the display target image shown on the monitor 13 to their desired display target image.

When only a part, rather than the entirety, of the display target image is shown on the screen, as described above, the display area control unit 44 may move the viewpoint 35 in the direction along the x axis as well in response to the user's upward or downward operation of the operating stick 28R. With the above, when a part of the display target image is shown enlarged, the user can move the enlarged range in their desired direction. In showing a part of the display target image enlarged, as described above, restricting the scrolling, in particular, can facilitate the selection by the user, of a range for enlarged display.

Further, when the user operates the cross key 20 downward or moves the operating stick 28L downward (that is, size reduction of the display target image shown on a screen is instructed), with the scrolling stopped, the display area control unit 44 moves the viewpoint 35 in the z axial positive direction in response to the user's instruction. When the height h of the viewpoint 35 accordingly exceeds a predetermined value h1, the display area control unit 44 releases the restriction on changing the display target image within the frame image. That is, the image display process unit 44 releases restriction on scrolling, and resumes a process to move the viewpoint 35 in the y axial positive direction at a predetermined moving speed. With the above, the display target image within the frame image becomes smaller as instructed by the user, and the display target image shown within the frame image resumes being scrolled, thereby being sequentially changed. That is, the user can resume viewing the respective display target images even without issuing an explicit instruction to resume scrolling.

Also, when the height h of the viewpoint 35 becomes equal to or larger than a predetermined value in response to the user's instruction to reduce the size of the display target image, the display target placing unit 41 switches the one-line placement pattern, shown in FIG. 7, to the three-line placement pattern, shown in FIG. 6. In the above as well, similar to the above described example, the focused object O determined based on the position of the watched point P at the time of receiving the instruction is used as a reference in effecting the placement. With the above, display target images yet to be shown at the time can be shown, while being scrolled, in the three-line placement pattern on the screen. As described above, as the image objects 33 are placed so as to be included in the placement area 37 having a width in accordance with the instructed size of the display area 34, the image display device 1 can show the respective display target images in a manner in accordance with the scroll direction and the size of the respective display target images within the frame image.

It should be noted that the present invention is not limited to the above described embodiment, and various modified embodiments are applicable. For example, although it is described in the above that the display target placing unit 41 places the respective image objects 33 in either a one-line or three-line placement pattern according to the size of the display area 34, this is not an exclusive example, and the image objects 33 may be placed in various placement patterns. Also, the display target placing unit 41 may select one placement pattern from among three or more placement pattern candidates, depending on the size of the display area 34.

Also, the display target is not limited to a photographic image and so forth read from an information storage medium, and may be an image of various kinds, including a document image, and so forth. Further, although it is described in the above that the virtual plane 32 is a flat surface defined within a virtual three dimensional space, this is not an exclusive example, and the virtual plane 32 may be a two dimensional flat surface having a display area simply defined thereon. Alternatively, the virtual plane 32 may be a curved plane.

Although it is described in the above that the display area 34 defined on the virtual plane 32 is moved to thereby scroll the display target within the frame image shown on the monitor 13 so that the display target within the frame image are sequentially changed, the image display device 1 may delete, instead of scroll, the display target within the frame image every predetermined period of time and re-render a next display target. With this process, the display target images can be sequentially switched and shown on the monitor 13, like, e.g., a slideshow. With this case as well, when change of the magnification ratio for the display target within the frame image is instructed, the image switching can be stopped by restricting the re-rendering of the display target according to the instructed magnification ratio.

Also, the display area control unit 44 may restrict change of the display target image not only when enlargement of a display target image is instructed, but may restrict change of the display target image (that is, restrict scrolling) according to an instructed reduction ratio when size reduction of the display target image is instructed. For example, when the height h of the viewpoint 35 becomes equal to or larger than a predetermined value according to the user's instruction to reduce the size of the display target image (that is, the instructed reduction ratio for a display target image has become equal to or larger than a predetermined value), the display area control unit 44 may stop the moving viewpoint 35 along the y axial direction, to thereby stop the scrolling.

The invention claimed is:
1. An image display device comprising:
an image display unit for displaying an image showing at least one of a plurality of display targets;
a target changing unit for sequentially changing the display target shown by the image by scrolling the plurality of display targets automatically on the display device; and a restriction unit for stopping, when change of an increase in magnification ratio for the display target shown by the image is instructed by a user without selecting any of the display targets, scrolling of the display target by the target changing unit according to an instructed magnification ratio, wherein the restriction unit, when change of the magnification ratio to a value equal to or larger than a predetermined value is instructed, restricts scrolling of the display targets by the target changing unit, and wherein the restriction unit, when change of the magnification ratio to a value smaller than the predetermined value is instructed, releases scrolling of the change of the display targets.

2. The image display device according to claim 1, further comprising a placing unit for placing the plurality of display targets on a virtual plane, wherein the image display unit displays an image showing a picture inside a display area defined on a part of the virtual plane and including at least one of the plurality of display targets placed, the target changing unit moves at least either one of the respective display targets and display area along a predetermined direction defined on the virtual plane, relative to the virtual plane, to thereby scroll the display targets, and the restriction unit restricts the scrolling of the respective display targets or the display area relative to the virtual plane, to thereby restrict change of the display targets.

3. The image display device according to claim 2, wherein the restriction unit moves the display area or the respective display targets to a position which is determined based on a position of the display area and the respective display targets on the virtual plane at a time of receiving the instruction, and then stops the scrolling of the display area or the respective display targets.

4. An image display device, comprising:

a unit for displaying an image showing a picture in which a plurality of display targets sequentially automatically scroll on a screen; and a unit for stopping, when change of an increase in magnification ratio for a display target shown by the image is instructed by a user without selecting any of the display targets, scrolling of the display targets on the screen according to an instructed magnification ratio, wherein, when change of the magnification ratio to a value equal to or larger than a predetermined value is instructed, scrolling of the display targets is restricted, and wherein, when change of the magnification ratio to a value smaller than the predetermined value is instructed, scrolling of the change of the display targets is released.

5. An image display method executed on a device having a processor comprising:

an image display step of displaying on a display an image showing at least one of a plurality of display targets;

a target changing step of sequentially changing the display target shown by the image by automatically scrolling the plurality of display targets on the display device; and a restriction step of stopping, when change of an increase in magnification ratio for the display target shown by the image is instructed by a user without selecting any of the display targets, scrolling of the display target at the target changing step according to an instructed magnification ratio, wherein, when change of the magnification ratio to a value equal to or larger than a predetermined value is instructed, scrolling of the display targets is restricted, and wherein, when change of the magnification ratio to a value smaller than the predetermined value is instructed, scrolling of the change of the display targets is released.

6. A non-transitory computer readable information storage medium storing a program for causing a computer to function as:

an image display unit for displaying an image showing at least one of a plurality of display targets;

a target changing unit for sequentially changing the display target shown by the image by automatically scrolling the plurality of display targets on the display device; and a restriction unit for stopping, when change of an increase in magnification ratio for the display target shown by the image is instructed by a user without selecting any of the display targets, scrolling of the display target by the target changing unit according to an instructed magnification ratio, wherein the restriction unit, when change of the magnification ratio to a value equal to or larger than a predetermined value is instructed, restricts scrolling of the display targets by the target changing unit, and wherein the restriction unit, when change of the magnification ratio to a value smaller than the predetermined value is instructed, releases scrolling of the change of the display targets.

* * * * *